US010543914B2

(12) United States Patent
Darrow, Jr. et al.

(10) Patent No.: US 10,543,914 B2
(45) Date of Patent: Jan. 28, 2020

(54) NON-LOADED MANUAL BLADE FOLD ASSEMBLY

(71) Applicant: Sikorsky Aircraft Corporation, Stratford, CT (US)

(72) Inventors: David A. Darrow, Jr., Stratford, CT (US); Frank P. D'Anna, Seymour, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 356 days.

(21) Appl. No.: 14/915,147

(22) PCT Filed: Mar. 27, 2014

(86) PCT No.: PCT/US2014/031943
§ 371 (c)(1),
(2) Date: Feb. 26, 2016

(87) PCT Pub. No.: WO2015/030874
PCT Pub. Date: Mar. 5, 2015

(65) Prior Publication Data
US 2016/0214711 A1     Jul. 28, 2016

Related U.S. Application Data

(60) Provisional application No. 61/871,074, filed on Aug. 28, 2013.

(51) Int. Cl.
*B64C 27/50*     (2006.01)
*B64C 27/10*     (2006.01)

(52) U.S. Cl.
CPC .............. *B64C 27/50* (2013.01); *B64C 27/10* (2013.01)

(58) Field of Classification Search
CPC ......... B64C 27/50; B64C 27/10; B64C 27/54; B64C 27/18; B64C 27/001
(Continued)

(56) References Cited

U.S. PATENT DOCUMENTS 3,277,767 A    10/1966   Allen et al.
3,331,444 A     7/1967   Toner
(Continued)

OTHER PUBLICATIONS

International Search Report, International Application No. PCT/US2014/031938, dated Sep. 22, 2014, pp. 1-5.
(Continued)

*Primary Examiner* — Justin D Seabe
*Assistant Examiner* — Justin A Pruitt
(74) *Attorney, Agent, or Firm* — Cantor Colburn LLP (57) ABSTRACT

A rotor blade configured to fold about a blade fold axis includes a first section and a second section. The first section is configured to mount to a rotor hub and includes a first connector having at least one first opening. The second section includes a second connector having at least one second opening. The second section is rotatably coupled to the first section and is configured to rotate about the blade fold axis between an aligned position and a rotated position. A linkage is operably coupled to the first section and the second section. The linkage includes a plurality of links loosely connected such that the linkage is configured to support the second section of the rotor blade only when the second section is in the rotated position.

16 Claims, 6 Drawing Sheets

(58) Field of Classification Search
USPC .................................................. 416/142, 143
See application file for complete search history.

(56) References Cited

U.S. PATENT DOCUMENTS

| | | | |
|---|---|---|---|
| 4,014,484 A * | 3/1977 | Mouille | ................ B64C 27/001 |
| | | | 188/268 |
| 4,712,978 A | 12/1987 | Tiemann | |
| 4,738,592 A | 4/1988 | Cavanaugh | |
| 4,786,236 A * | 11/1988 | Hahn | ..................... B64C 27/50 |
| | | | 416/134 A |
| 4,997,218 A | 3/1991 | Culling | |
| 5,249,926 A | 10/1993 | D'Anna et al. | |
| 6,752,596 B2 | 6/2004 | Mondet et al. | |
| 6,783,327 B1 | 8/2004 | Davis | |
| 7,210,651 B2 | 5/2007 | Scott | |
| 7,857,590 B1 | 12/2010 | Neal | |
| 2004/0026564 A1 | 2/2004 | Romani et al. | |
| 2004/0118970 A1 | 6/2004 | Muylaert et al. | |
| 2006/0147309 A1 | 7/2006 | Munsch | |
| 2007/0215749 A1 | 9/2007 | Miner et al. | |
| 2008/0112808 A1 | 5/2008 | Schmaling et al. | |
| 2009/0084891 A1 | 4/2009 | Darrow, Jr. et al. | |
| 2009/0097973 A1 | 4/2009 | Cabrera et al. | |
| 2011/0156413 A1 | 6/2011 | Teuthorn | |
| 2012/0025012 A1 | 2/2012 | Arlton et al. | |
| 2012/0175461 A1 | 7/2012 | Van Der Westhuizen et al. | |
| 2015/0225076 A1* | 8/2015 | Lawrence | ............... B64C 27/18 |
| | | | 415/81 |
| 2016/0207622 A1 | 7/2016 | Darrow, Jr. et al. | |

OTHER PUBLICATIONS

International Search Report, International Application No. PCT/US2014/031943, dated Sep. 11, 2014, pp. 1-20.
Written Opinion of the International Searching Authority, International Application No. PCT/US2014/031938, dated Sep. 22, 2014, pp. 1-6.
Written Opinion of the International Searching Authority, International Application No. PCT/US2014/031943, dated Sep. 11, 2014, pp. 1-6.
EP Communication; Extended European Search Report; Application No. 14839405.9-1754/3038903 PCT/US2014031943; dated Apr. 5, 2017; pp. 1-8.
EP Communication; Extended European Search Report; Application No. 14840568.1-1754/3038910 PCT/US2014031938; dated May 11, 2017; pp. 1-8.
PCT International Preliminary Report on Patentability; International Application No. PCT/US2014/031938; International Filing Date: Mar. 27, 2014; dated Mar. 1, 2016; pp. 1-7.
PCT International Preliminary Report on Patentability; International Application No. PCT/US2014/031943; International Filing Date: Mar. 27, 2014; dated Mar. 1, 2016; pp. 1-7.

* cited by examiner

NON-LOADED MANUAL BLADE FOLD ASSEMBLY

CROSS-REFERENCE TO RELATED APPLICATION

This application claims the benefit of U.S. provisional patent application Ser. No. 61/871,074 filed Aug. 28, 2013, the entire contents of which are incorporated herein by reference.

STATEMENT REGARDING FEDERALLY SPONSORED RESEARCH OR DEVELOPMENT

This invention was made with Government support under Technology Investment Agreement No. W911W6-13-2-0003 with the United States Army. The Government has certain rights in the invention.

BACKGROUND OF THE INVENTION

Exemplary embodiments of the invention relate to a blade fold assembly for a rotary wing aircraft, and more particularly, to a handle for operating a blade fold system.

The flight capabilities of rotary-wing aircrafts make them effective for a wide variety of missions; however, operation of rotary-wing aircraft in certain environments may be limited by the overall structural envelopes thereof. The radial dimensions of a rotary-wing aircraft main rotor assembly results in a rotary-wing aircraft having relatively large structural envelopes which may impact its utility in some environments. For example, space on a ship or vessel is generally at a premium and the structural envelope of a rotary wing aircraft may require a significant allocation of such limited space. Furthermore, strategic and tactical considerations in the military utilization of rotary-wing aircrafts has led to a requirement for rotary-wing aircrafts having main rotor assemblies that may be readily reconfigured for rapid deployment, routine transport, and/or stowage by reducing the structural envelope.

One way to reduce the structural envelope of rotary-wing aircraft to facilitate rapid deployment, routine transport, stowage, and reduce the vulnerability thereof to environmental conditions is to design the main rotor assembly so that the main rotor blades fold relative to the main rotor hub. However, conventional blade folding systems are cumbersome and are susceptible to drag, thereby decreasing the efficiency of the rotary wing aircraft in flight.

BRIEF DESCRIPTION OF THE INVENTION

According to one embodiment of the invention, a rotor blade configured to fold about a blade fold axis includes a first section and a second section. The first section is configured to mount to a rotor hub and includes a first connector having at least one first opening. The second section includes a second connector having at least one second opening. The second section is rotatably coupled to the first section and is configured to rotate about the blade fold axis between an aligned position and a rotated position. A linkage is operably coupled to the first section and the second section. The linkage includes a plurality of coupled links such that the linkage is configured to support the second section of the rotor blade only when the second section is in the rotated position.

In addition to one or more of the features described above, or as an alternative, in further embodiments the plurality of links are coupled with a bushing having a clearance fit.

In addition to one or more of the features described above, or as an alternative, in further embodiments the plurality of links is formed form a metal material.

In addition to one or more of the features described above, or as an alternative, in further embodiments the linkage includes a spindle connector extending from a portion of the spindle and a spar connector extending from a portion of the spar.

In addition to one or more of the features described above, or as an alternative, in further embodiments at least one of the spar connector and the spindle connector is fastened to the spindle or the spar, respectively.

In addition to one or more of the features described above, or as an alternative, in further embodiments at least one of the spar connector and the spindle connector is integrally formed with the spindle or the spar, respectively.

In addition to one or more of the features described above, or as an alternative, in further embodiments the plurality of links includes a first link coupled to an end of the spindle connector, a second link coupled to an end of the spar connector, a third link coupled to a central portion of the spindle connector and a fourth link coupled to a central portion of the spar connector. The first link is also coupled to a central portion of the second link. The second link is also coupled to a central portion of the third link. The third link and the fourth link are coupled to one another.

In addition to one or more of the features described above, or as an alternative, in further embodiments at least one pin is configured to extend through the first opening and the second opening when the second section is in the aligned position.

In addition to one or more of the features described above, or as an alternative, in further embodiments when the pin is arranged within the first opening and the second opening, rotation of the second section about the blade fold axis is limited.

In addition to one or more of the features described above, or as an alternative, in further embodiments when the second section of the rotor blade is in the aligned position, the pin extending through the first opening and the second opening is configured to support the second section of the rotor blade.

In addition to one or more of the features described above, or as an alternative, in further embodiments the first section includes a blade retention fairing and the second section includes a blade root fairing.

In addition to one or more of the features described above, or as an alternative, in further embodiments when the second section is in the aligned position, the linkage is positioned within the blade retention fairing and the blade root fairing.

According to another embodiment of the invention, a rotor blade configured to fold about a blade fold axis includes a first section and a second section. The first section is configured to mount to a rotor hub and includes a first connector arranged at a first end thereof. The second section includes a second connector arranged at an end of the second section adjacent the first connector. The second section is rotatably coupled to the first section and is configured to rotate about the blade fold axis between an aligned position and a rotated position. A linkage operably couples the first connector and the second connector. The linkage is configured to defines the blade fold axis at a position generally offset from the rotor blade.

In addition to one or more of the features described above, or as an alternative, in further embodiments the first section includes a first fairing and the second section includes a second fairing.

In addition to one or more of the features described above, or as an alternative, in further embodiments when the second section is in the aligned position, the linkage is positioned within the first fairing and the second fairing.

In addition to one or more of the features described above, or as an alternative, in further embodiments the linkage includes a plurality of links.

In addition to one or more of the features described above, or as an alternative, in further embodiments the plurality of links are coupled with a bushing having a clearance fit.

In addition to one or more of the features described above, or as an alternative, in further embodiments the plurality of links are formed from a metal material.

According to yet another embodiment of the invention, a method of folding a rotor blade having a first section and a second section, the second section being rotatably coupled to the first section and configured to rotate about a blade fold axis between an aligned position and a rotated position is provided including removing at least one pin coupling the first section and the second section when the second section is in the aligned position. The second section of the rotor blade is rotated about the blade fold axis from the aligned position to the rotated position such that a linkage coupled the first section and the second section is generally extended.

In addition to one or more of the features described above, or as an alternative, in further embodiments the second section of the rotor blade is pivoted about the blade fold axis from the rotate position to the aligned position such that the linkage is generally collapsed. At least one pin configured to couple the first section and the second section when in the aligned position is installed.

Technical effects include the ability to fold a rotor blade using a linkage configured to support the rotor blade only when the rotor blade is in a folded position.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
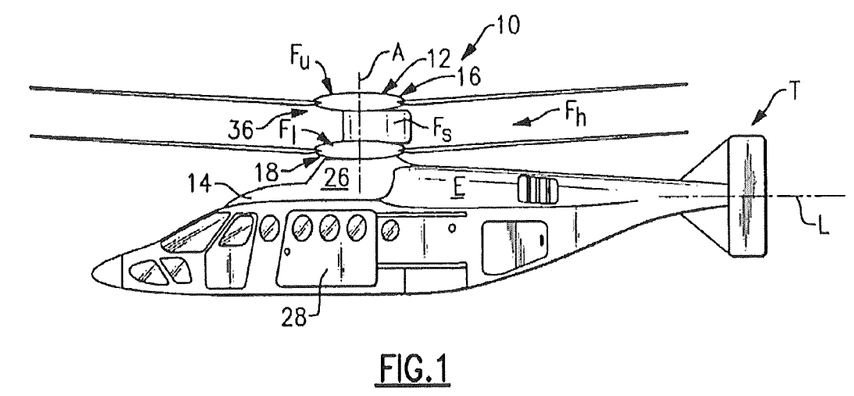
FIG. 1 is a side view of an example of a rotary wing aircraft.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems and non-coaxial rotor systems will also benefit from the present invention.

A main gearbox 26 which may be located above the aircraft cabin drives the rotor system 12. The translational thrust system T may be driven by the same main gearbox 26 which drives the rotor system 12. The main gearbox 26 is driven by one or more engines (illustrated schematically at E). As shown, the main gearbox 26 may be interposed between the gas turbine engines E, the rotor system 12 and the translational thrust system T.

Figure 2:
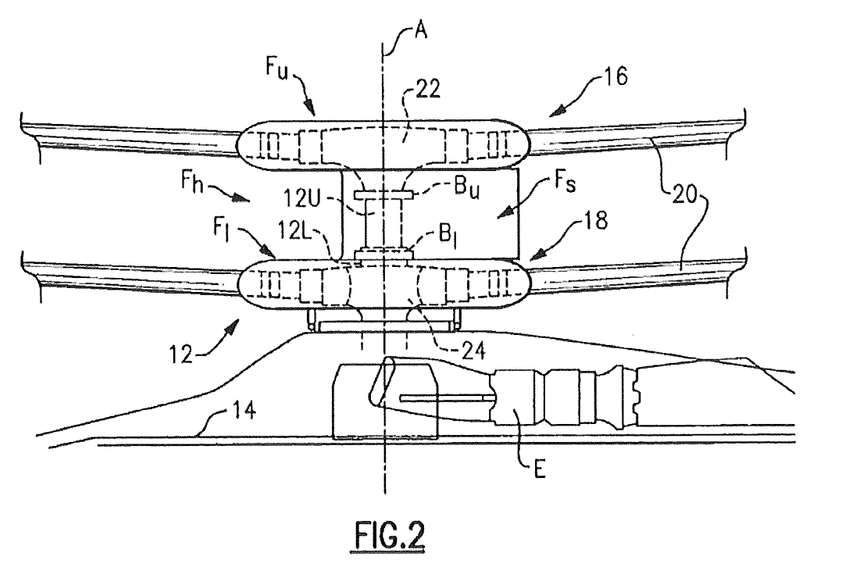
FIG. 2 is an cross-sectional view of a main rotor system of the aircraft illustrated in FIG. 1.
Figure 3:
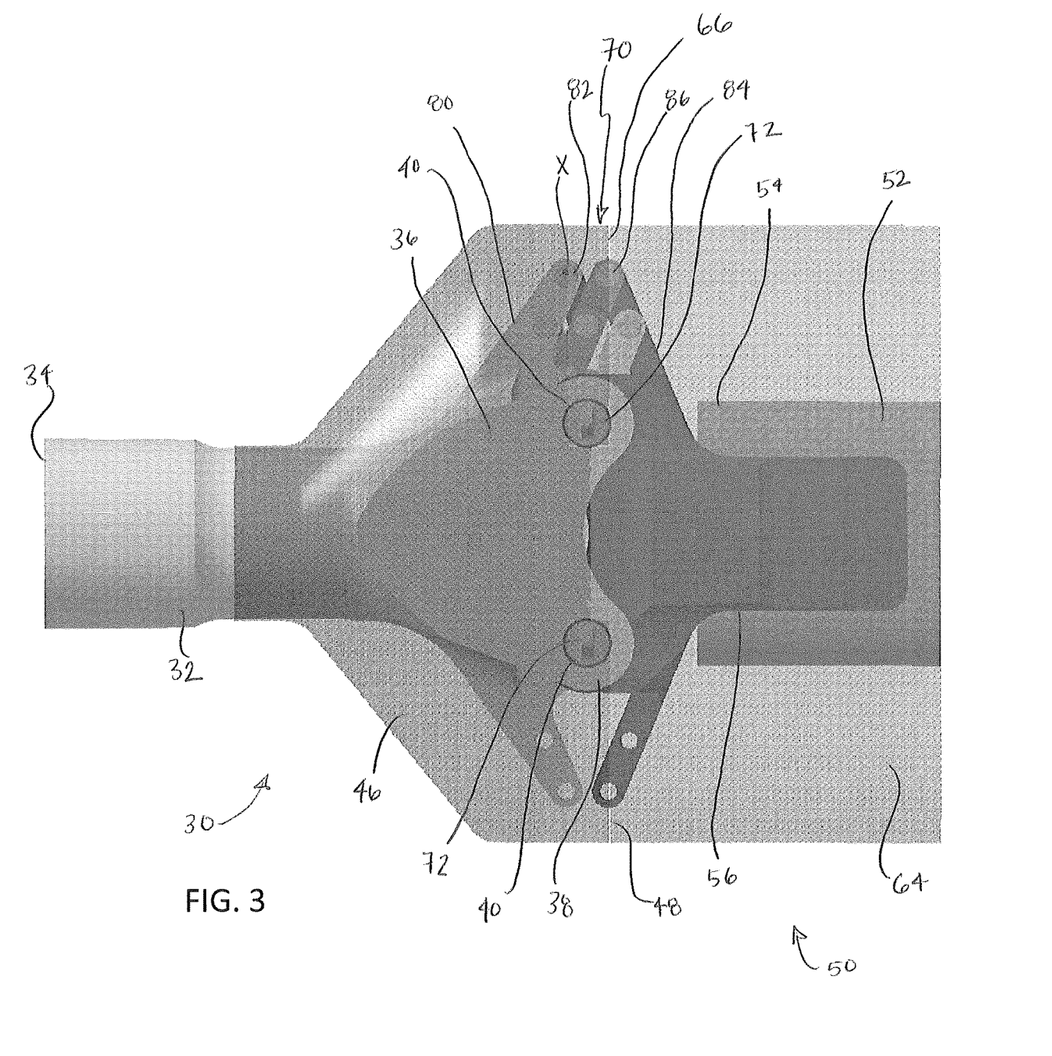
FIG. 3 is a top view of a portion of a rotor blade of the main rotor system in a generally aligned position according to an embodiment of the invention.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about a rotor axis of rotation A. A plurality of the main rotor blade assemblies 20 project radially outward from the hub assemblies 22, 24. Any number of main rotor blade assemblies 20 may be used with the rotor system 12.

While not required in all aspects, the shown rotor system 12 also includes a rotor hub fairing system Fh generally located between and around the upper and lower rotor systems 16, 18 such that the rotor hub assemblies 22, 24 are at least partially contained therein. The rotor hub fairing system Fh preferably includes an upper hub fairing Fu, a lower hub fairing Fl and a shaft fairing Fs there between. The shaft fairing Fs is preferably attached to the counter-rotating, coaxial rotor system 12 through a bearing arrangement Bu, Bl such that the shaft fairing Fs is aligned with the relative wind in forward flight but may be free to pivot during low speed maneuvering. The upper bearing Bu and the lower bearing Bl are respectively located adjacent an upper portion and a lower portion of the shaft fairing Fs. The upper bearing Bu is preferably attached to one rotor shaft 12U while the lower bearing Bl attached to the other rotor shaft 12L such that the bearings counter-rotate and net bearing drag is relatively low.

Referring now to FIGS. 3-8, at least one of the rotor blade assemblies 20 includes a rotor blade 28 configured to fold about a fold axis X (best shown in FIG. 3 and FIG. 7), generally perpendicular to the blade chord at or near the fold axis X. The rotor blade 28 is divided into a first section 30 and a complementary second section 50. The first section 30 includes a spindle 32, a first end 34 of which is mounted to a rotor hub, such as rotor hub 22 or 24 for example, such that the spindle 32 extends radially outward from the hub. In the illustrated, non-limiting embodiment, the second end 36 of the spindle 32 includes a first connector 38 having at least one opening 40. The first section 30 of the rotor blade 28 also includes a blade retention fairing 46 that generally surrounds the spindle 32. A portion of the first connector 38 including the at least one opening 40 is positioned beyond a first end 48 of the blade retention fairing 46.

The second section 50 of the rotor blade 28 includes a blade spar 52 (best shown in FIG. 3) having a second connector 56 (FIG. 4) coupled to or integrally formed with the end 54 of the blade spar 52 adjacent the first section 30. The second connector 56 also includes at least one opening 58 complementary to an opening 40 of the first connector 38. A blade root fairing 64 surrounds a portion of the blade spar 52 of the second section 50. The one or more openings 58 formed within the second connector 56 extend beyond a first end 66 of the blade root fairing 64.

Figure 4:
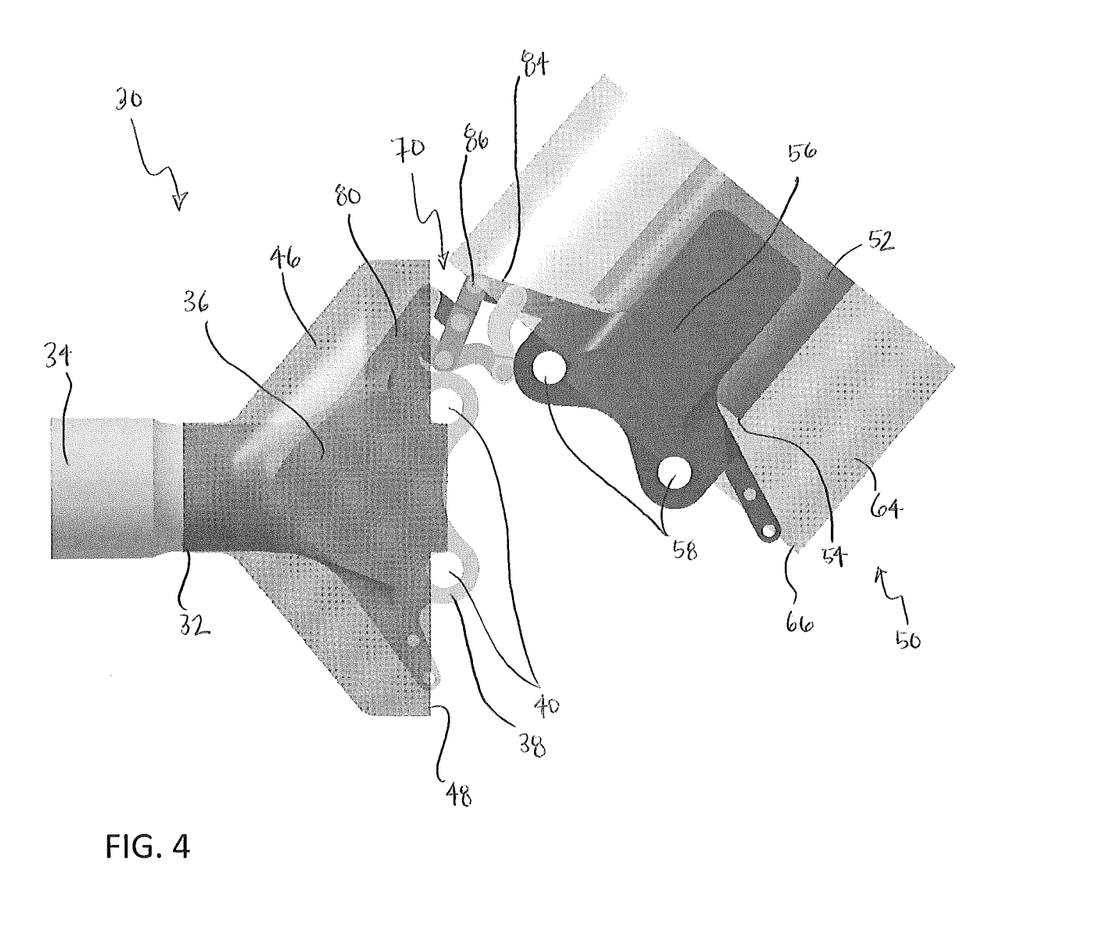
FIG. 4 is a top view of a portion of a rotor blade of the main rotor system in a generally rotated position according to an embodiment of the invention.

A linkage 70 arranged within the fairings 46, 64 rotatably couples the blade spar 52 to the spindle 32, such that the second section 50 of the rotor blade 28 is configured to rotate to a desired angle about the blade fold axis X from an aligned position (FIG. 3) to a rotated position (FIG. 4). As shown, the linkage 70 allows for the blade fold axis X to be generally offset from the longitudinal axis of the rotor blade 30, such as outside of the blade spar 52 and spindle 32. When the second section 50 is in the generally aligned position relative to the first section 30, the first and second section 30, 50 may be coupled to one another to restrict movement of the second section 50 about the blade fold axis X. In the illustrated, non-limiting embodiment, when the second section 50 and the first section 30 of the rotor blade 28 are aligned, the first connector 38 and the second connector 56 are arranged in an overlapping arrangement such that the connectors 38, 56 may be coupled, for example with a pin 72 extending through aligned openings 40, 58. Once the one or more pins 72 are inserted into the overlapped openings 40, 58, rotation of the second section 50 relative to the first section 30 may be limited, or blocked entirely.

Figure 5:
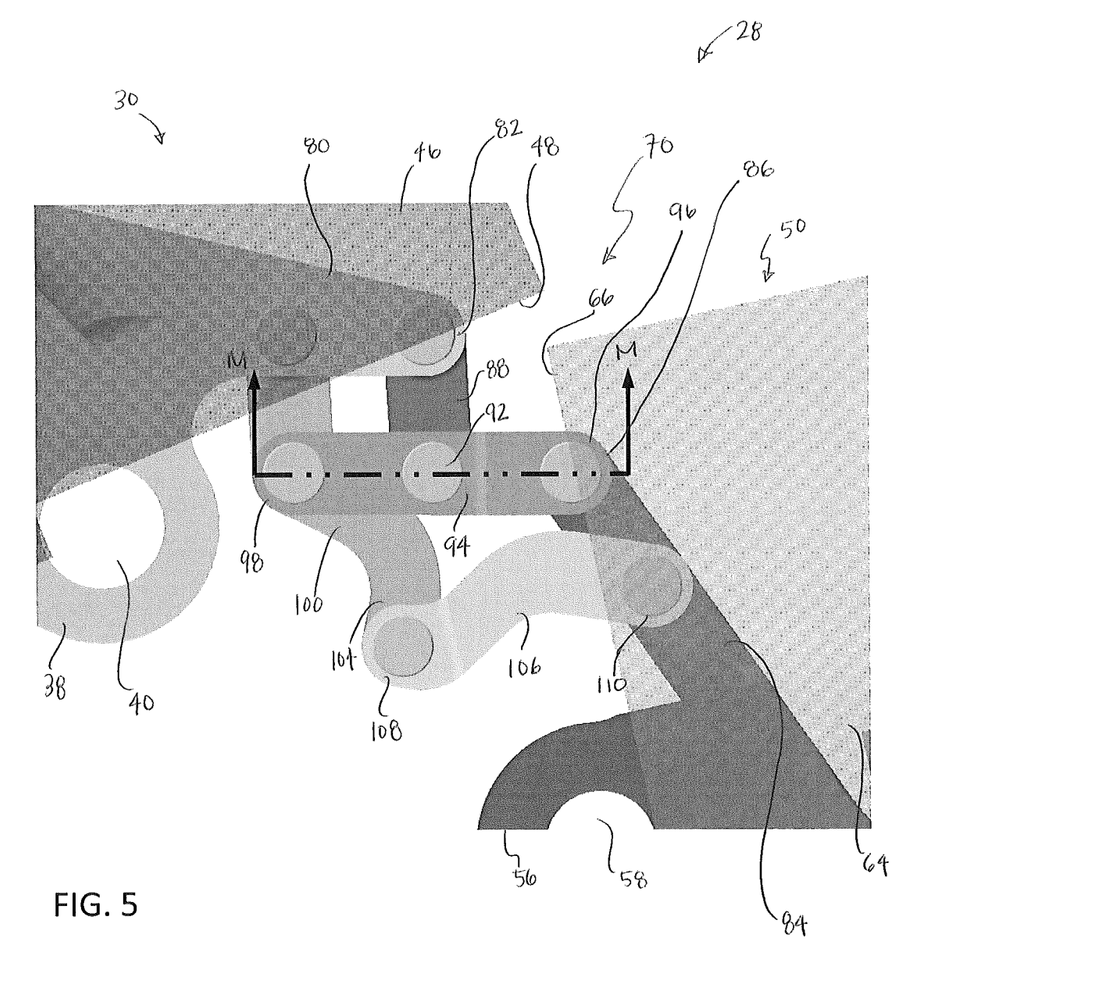
FIG. 5 is a detailed top view of the linkage connecting the first and second sections of a rotor blade according to an embodiment of the invention.
Figure 6:
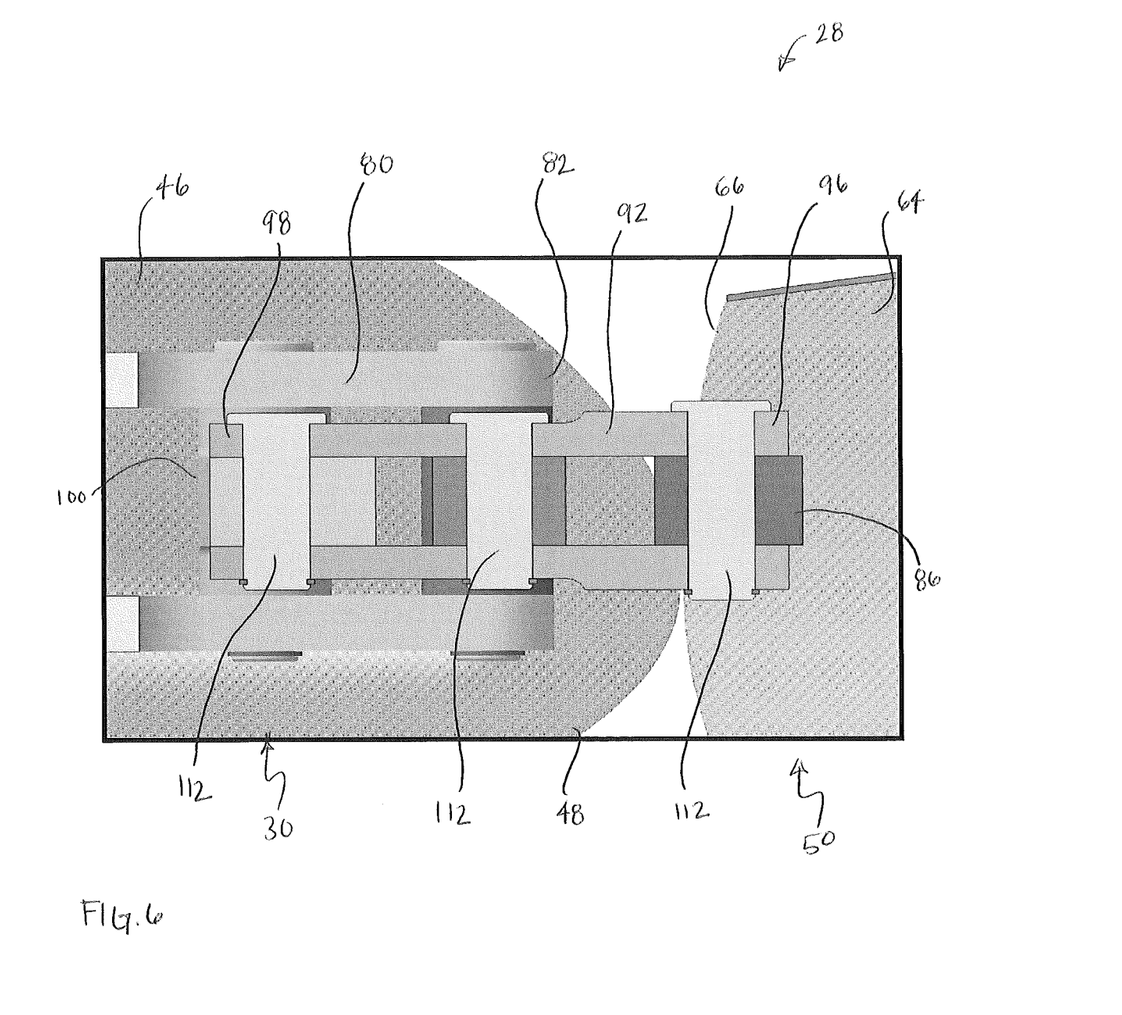
FIG. 6 is a cross-sectional view of the linkage of FIG. 5 taken along line M-M according to an embodiment of the invention.
Figure 7:
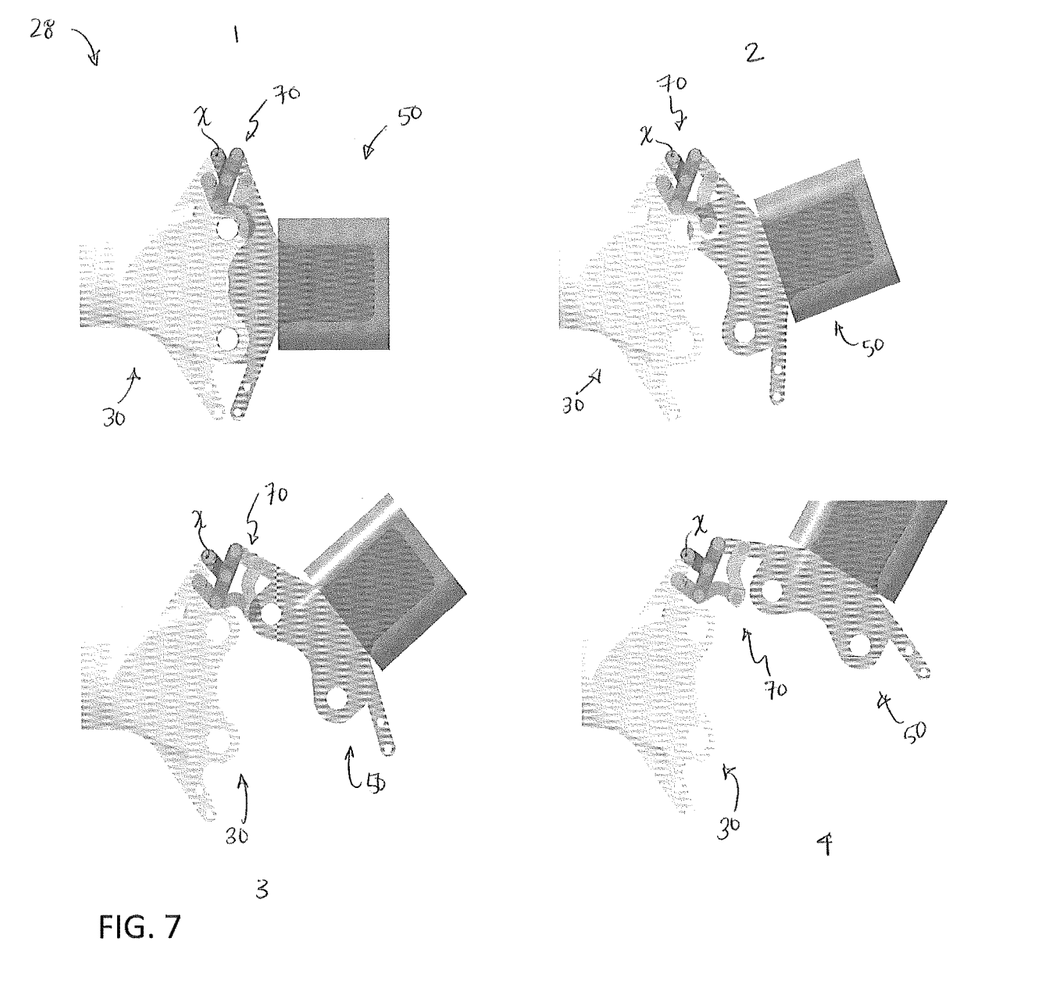
FIG. 7 is a series of top views of a rotor blade as the rotor blade rotated from an aligned position to a rotated position according to an embodiment of the invention.

Referring now to FIGS. 5-7, the linkage 70 is illustrated in more detail. A spindle connector 80 extends at an angle from a portion of the spindle 32 or the first connector 36, towards the second section 50 of the rotor blade 28; similarly a spar connector 84 extends at an angle from a portion of the blade spar 52 or the second connector 56 towards the first section 30 of the rotor blade 28 (best shown in FIG. 3). The spindle connector 80 and the spar connector 84 may be links fastened to the first and second section 30, 50, respectively, or alternatively, may be integrally formed with first and second sections 30, 50, respectively. Both the spindle connector 80 and the spar connector 84 are arranged on the same side of the rotor blade 28 such that when the second section 50 of the rotor blade 28 is in the generally aligned position, the spindle connector 80 and spar connector 84 are generally adjacent one another.

The linkage 70 includes a first link 88 having a first end 90 connected to an end 82 of the spindle connector 80 and a second link 94 having a first end 96 connected to the end 86 of the spar connector 84. A second end 92 of the first link 88 is coupled to a center of the second link 94. The first end 102 of a third link 100 is connected to a central portion of the spindle connector 80 and a second end 98 of the second link 94 is connected to a central portion of the third link 100. A fourth link 106 is coupled at a first end 108 to the second end 104 of the third link 100 and at a second end 110 to a central portion of the spar connector 84. In one embodiment, at least a portion of one or both of the third and fourth links 100, 106 is curved, such as to avoid interference with an adjacent pin 72 for example.

The links 88, 94, 100, 106 of the linkage 70, as well as the spindle connector 80 and the spar connector 84 may be formed from a metal material, such as steel for example. As illustrated by the cross-section shown in FIG. 6, the links 88, 94, 100, 106 are loosely connected to each another and to the spar and spindle connectors 80, 84. In the illustrated, non-limiting embodiment, each connection between adjacent links 88, 94, 100, 106 of the linkage 70 is formed by a bushing 112 having a loose or clearance fit. As a result of the loose connections of the linkage 70 and the tight tolerance of the at least one pin 72 within the aligned openings 40, 58, the pin(s) 72 is configured to carry the flight loads of the rotor blade 28 during operation of the rotary wing aircraft 10. Therefore, when the second section 50 is in the generally aligned position, the force of the rotor blade 28 is transmitted through the at least one pin 72 coupling the first and second sections 30, 50 and not through the linkage 70. The linkage 70 is, however, configured to support the weight of the rotor blade 28 when the second section 50 is pivoted about the blade fold axis X to the rotated position. Because the linkage 70 coupling the first section 30 and the second section 50 extend between the spar connector 84 and the spindle connector 80, the linkage 70, and therefore the effective blade fold axis X defined by the linkage 70, is offset from the rotor blade 28.

The scissoring movement of the linkage 70 as the second section 50 rotates about the blade fold axis X is shown in more detail in the sequence illustrated in FIG. 7. When the first and second sections 30, 50 of the rotor blade 28 are aligned, the linkage 70 is in a generally collapsed configuration, with the plurality of links 88, 94, 100, 106 positioned directly adjacent one another and angled towards the middle of the rotor blade 28. As the second section 50 rotates about blade fold axis X, the fourth link 106 causes the third link 100 to rotate to a horizontal position. The rotation of the third link 100 causes the first and second links 88, 94 to similarly expand and separate from one another until the spar 52 reaches the rotated position. When the second section 50 is rotated about the blade fold axis X back towards the aligned position, the plurality of links 88, 94, 100, 106 pivot in the opposite direction such that the links 88, 94, 100, 106 contract towards one another until returning to their original position.

A rotor blade 28 including the linkage 70 is able to easily rotate between an aligned position and a rotated position. Because the pin coupling the first and second sections 30, 50 rather than the linkage is configured to carry the loads of the rotor blade 28 during flight, the size and strength of the linkage may be reduced. As a result, the cost-effective linkage 70 may be positioned within the adjacent blade fairings 46, 64. In addition, the clearance between the fairings 46, 64 allows for rotation of the second section 50 without having to remove the blade root fairing 64. While a specific linkage 70 arrangement is shown, it is understood that other linkage arrangements can be used which also provide the off-blade effective hinge axis in other aspects of the invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, while shown as being relatively close to the rotor hub, the opening 72 between the first and second sections 30 and 50 could be farther outboard from what is shown. Additionally, while various embodiments of the invention have been described, it is to be understood that aspects of the invention may include only some of the described embodiments. By way of example, aspects could be used in fixed wing aircraft, but the invention is not limited to aircraft. Accordingly, the invention is not to be seen as limited by the foregoing description, but is only limited by the scope of the appended claims.

What is claimed is:

1. A rotor blade configured to fold about a blade fold axis, comprising:
   a first section configured to mount to a rotor hub, the first section including a first connector having at least one first opening;
   a second section including a second connector having at least one second opening, the second section being rotatably coupled to the first section and configured to rotate about the blade fold axis between an aligned position and a rotated position;
   at least one pin positionable within both the at least one first opening and the at least one second opening only when the rotor blade is in the aligned position; and
   a linkage operably coupled to the first section and the second section, the linkage including:
   a spindle connector extending from a portion of the first section; and
   a spar connector extending from a portion of the second section
   a first link coupled to an end of the spindle connector;
   a second link coupled to an end of the spar connector, the first link being coupled to a central portion of the second link;
   a third link coupled to a central portion of the spindle connector, the second link being coupled to a central portion of the third link; and
   a fourth link coupled to a central portion of the spar connector, and to an end of the third link;
   wherein the second section of the rotor blade is supported by the at least one pin when the rotor blade is in the aligned position, and the second section of the rotor blade is supported by only the linkage when the rotor blade is in the rotated position.

2. The rotor blade according to claim 1, wherein the plurality of links are coupled with a bushing having a clearance fit.

3. The rotor blade according to claim 1, wherein the plurality of links of the linkage are formed from a metal material.

4. The rotor blade according to claim 1, wherein at least one of the spindle connector and the spar connector are fastened to the first section and the second section, respectively.

5. The rotor blade according to claim 1, wherein the spindle connector and the spar connector are integrally formed with the first section and the second section, respectively.

6. The rotor blade according to claim 1, wherein when the at least one pin is arranged within the first opening and the second opening, rotation of the second section about the blade fold axis is limited.

7. The rotor blade according to claim 1, wherein the first section includes a blade retention fairing and the second section includes a blade root fairing.

8. The rotor blade according to claim 7, wherein when the second section is in the aligned position, the linkage is positioned within the blade retention fairing and the blade root fairing.

9. A rotor blade configured to fold about a blade fold axis, comprising:
   a first section configured to mount to a rotor hub, the first section including a first connector arranged at a first end thereof;
   a second section including a second connector, the second connector being arranged at an end of the second section generally adjacent the first connector, the second section being rotatably coupled to the first section and configured to rotate about the blade fold axis between an aligned position and a rotated position;
   a linkage arranged adjacent and connected to a side of both the first section and the second section, wherein the linkage defines the blade fold axis at a position generally laterally offset from the side of the rotor blade, wherein the linkage is transformable between a collapsed position and a generally extended position via a scissoring movement, the linkage being in the collapsed position when the second section is in the aligned position and the linkage is in the generally extended position when the second section is rotated about the blade fold axis to the rotated position; and
   a pin operable to couple the first section and the second section when in the aligned position.

10. The rotor blade according to claim 9, wherein the first section includes a first fairing and the second section includes a second fairing.

11. The rotor blade according to claim 10, wherein when the second section is in the aligned position, the linkage is positioned within the first fairing and the second fairing.

12. The rotor blade according to claim 9, wherein the linkage includes a plurality of links.

13. The rotor blade according to claim 12, wherein the plurality of links are coupled with a bushing having a clearance fit.

14. The rotor blade according to claim 12, wherein the plurality of links of the linkage are formed from a metal material.

15. A method of folding a rotor blade, the rotor blade having a first section and a second section, the second section being rotatably coupled to the first section and configured to rotate about a blade fold axis between an aligned position and a rotated position, comprising:
   removing at least one pin coupling the first section and the second section when the second section is in the aligned position; and
   rotating the second section of the rotor blade about the blade fold axis from the aligned position to the rotated position, wherein rotating the second section of the rotor blade causes a scissoring movement of a linkage coupled to the first section and the second section, wherein the scissoring movement causes the linkage to transform from a generally collapsed position to a generally extended position.

16. The method according to claim 15, further comprising:
   pivoting the second section of the rotor blade about the blade fold axis from the rotated position to the aligned position such that the linkage is generally collapsed; and
   installing at least one pin configured to couple the first section to the second section when in the aligned position.

* * * * *